Patented Mar. 15, 1932

1,849,616

UNITED STATES PATENT OFFICE

HARRY B. DYKSTRA, OF WILMINGTON, DELAWARE, ASSIGNOR TO E. I. DU PONT DE NEMOURS & COMPANY, OF WILMINGTON, DELAWARE, A CORPORATION OF DELAWARE

PREPARATION OF VINYL ACETATE

No Drawing. Application filed August 28, 1929. Serial No. 389,098.

This invention relates to a process for making vinyl acetate, and more particularly to a catalytic method of preparing vinyl acetate.

It is an object of this invention to produce vinyl acetate by a method involving the catalytic action of mercury compounds on acetic acid and acetylene at low temperatures. A further object is the production of vinyl acetate by such a process without the use of a diluent. A still further object is the invention of a process which will eliminate the necessity of using excess acetylene. Further objects will appear as the descriptions proceeds.

The invention will be described with particular reference to the production of vinyl acetate.

These objects are accomplished by the following invention: a mixture of acetic acid, mercuric sulfate, sulfo-acetic acid, and acetic anhydride is made and kept at a temperature below 50° C. and preferably below 25° C., the best temperature being between 5° C. and 25° C. To this mixture acetylene is introduced at a rate such that absorption is complete; no excess is used. The addition of acetylene is begun and continued until the mixture is "loaded", a process which requires time depending on the quantity of reagents and the rate of addition. Sodium acetate is then added and the resulting product distilled at a reduced pressure. The distillate is then fractionally distilled to separate the vinyl acetate. It is not necessary to distill twice as the distillation may be carried out in one step over sodium acetate.

The catalyst mixture described above comprising a mercury salt, a sulfo-carboxylic acid, and an acid anhydride is much superior to a catalyst consisting of a mercury compound alone, and it is to the use of this catalyst that much of the success of my process is due. The presence of acetic anhydride and sulfoacetic acid materially assists the reaction by assuring good absorption of acetylene and a high yield of vinyl acetate. The use of sodium or calcium acetate in the reaction mixture during the first distillation greatly minimizes the production of undesirable by-products. The omission of this step results in the reduction of the yield and in the product of some aldehyde and tar. The sodium acetate is best added after the reaction has taken place and before the first distillation, as the addition of it before the reaction would tend to destroy the catalyst in the reaction mixture.

Examples illustrative of this process are given below:

Example 1

Acetylene was introduced with stirring into a mixture of 600 g. glacial acetic acid, 43 g. finely divided mercuric sulfate, 30 g. sulfo-acetic acid, and 30 g. acetic anhydride, maintained at 5–15° C. at such a rate that absorption was complete. The addition of acetylene was continued for six hours, resulting in a gain in weight of 188 g. Fifty grams of anhydrous sodium acetate was added to the reaction product and the whole distilled under diminished pressure. The distillate was fractionally distilled at atmospheric pressure giving 349 g. vinyl acetate (b. p. 72–76° C.), 195 g. acetic acid (b. p. 115–125° C.), and 64 g. ethylidene diacetate (b. p. 160–170° C.). This is equivalent to yields of 60 per cent vinyl acetate and 13 per cent ethylidene diacetate, based on the acetic acid consumed. When omitting the step involving the addition of sodium acetate, the yields of both vinyl acetate and ethylidene diacetate were markedly reduced, acetaldehyde was liberated, and tarry products were formed.

Example 2

As an example of the influence of temperature on the respective yields of vinyl acetate and ethylidene diacetate, the results obtained at higher temperatures than 5–15° C. are cited.

Thirty grams of mercuric oxide were dissolved in 600 g. of acetic acid. To this mixture were added with stirring 13 g. of 30 per cent fuming sulfuric acid, 30 g. sulfoacetic acid, and 30 g. acetic anhydride. The mixture was treated with acetylene for five hours at 20–25° C. bringing about an increase in weight of 118 g. From this reaction product were obtained 173 g. vinyl acetate, 286 g. acetic acid, and 107 g. ethylidene diacetate. Yields in this case, based on acetic acid consumed, were 38.4 per cent vinyl acetate and 28 per cent ethylidene diacetate. A similar experiment, carried out at 50–54° C. resulted in a 6.5 per cent yield of vinyl acetate and a 66.7 per cent yield of ethylidene diacetate, also based on the acetic acid consumed.

*Example 3*

To a solution of 35 g. mercuric acetate in 600 g. acetic acid were added 90 g. of sulfo-acetic acid with stirring, followed by thirty grams of acetic anhydride. Acetylene was passed into the solution for seven hours at 5–15° C., causing an increase in weight of 197 g. Separating the reaction products as described in Example 1 yielded 354 g. vinyl acetate, 194 g. acetic acid, and 126 g. ethylidene diacetate. Yields, based on the acetic acid consumed, amounted to 61 per cent vinyl acetate and 25.5 per cent ethylidene diacetate.

*Example 4*

Considerable variations in the amounts of acetic anhydride and sulfo-acetic acid are possible provided the acetic anhydride is not reduced to too low a level. When acetic anhydride is omitted, the yield of vinyl acetate is markedly reduced. The acetic anhydride ratio may, however, be doubled without seriously affecting the result. In an experiment carried out with the same amounts of reactants listed in Example 1, except that double the amount of acetic anhydride was used, and adding the acetylene for nine hours instead of six, yields of vinyl acetate and ethylidene diacetate amounting to 64% and 13%, respectively, were obtained.

*Example 5*

Eighteen grams of mercuric oxide were dissolved in 444 g. propionic acid. Sufficient fuming sulfuric acid was then added to precipitate the mercury as the sulfate. Eighteen grams of sulfo-acetic acid and an equal amount of acetic anhydride were added and acetylene was passed in at about 0° C. for seven hours. The reaction mixture, which had gained 42 g., was distilled over sodium acetate, giving 49 g. of vinyl propionate (b. p. 90–100° C.), 294 g. propionic acid (135–145° C.) and 8 g. ethylidene dipropionate (over 180° C.). Yields, based on propionic acid consumed, amounted to 24 per cent vinyl propionate and 4.5 per cent ethylidene dipropionate.

It will be plain to those skilled in the art that obvious equivalents of the specific compounds of the catalyst mixtures described in the above examples can be used.

The advantages of the process are most numerous. First, the character of an apparently old reaction is entirely changed and gives as its major product a different product. Secondly, vinyl acetate is produced in great quantities without the use of a diluent, which results in the elimination of that step found in previous procedures involving the separation of the product from the diluent. Another advantage is that the major product of the reaction is vinyl acetate. A still further advantage is that it is unnecessary to use an excess of acetylene with its resulting dangers of explosion, inasmuch as the acetylene used is completely absorbed.

It will be apparent that the process is not limited to the use of vinyl acetate but can be used in the production of any vinyl ester of a carboxylic acid and that the specific methods recited are not to be construed as limitative, but that variations can be made in the proportions of the constituents, in the temperature and pressure, and in the specific constituents themselves. It is not necessary to go through the steps specifically as listed but changes in the procedure can be made such as will occur to persons skilled in the art. The invention, consequently, is to be construed as limited only by the appended claims.

I claim:

1. The process of making vinyl acetate consisting in the addition of acetylene to a solution consisting of acetic acid, sulfo-acetic acid, acetic anhydride and a mercury salt at a rate such that, and until, absorption of the acetylene is substantially complete and at a temperature below 50° C. in adding sodium acetate to the resulting material, in distilling under reduced pressure to remove the vinyl acetate, acetic acid and ethylidene diacetate, and of fractionally distilling to separate off the vinyl acetate.

2. The process described in claim 1 in which the temperature is kept below about 25° C.

3. In the process of making vinyl esters wherein acetylene is reacted with a lower fatty acid in the presence of a mercury salt-fatty acid anhydride catalyst the step which comprises distilling the reacted mixture in the presence of one of a group of compounds consisting of sodium acetate and calcium acetate.

4. The process of making vinyl esters which comprises reacting acetylene with a lower fatty acid in the presence of a mercury salt, sulfo-acetic acid, and a lower fatty acid anhydride.

5. The process of making vinyl esters which comprises reacting acetylene with a lower fatty acid in the presence of a mercury salt, sulfo-acetic acid, and an aliphatic monocarboxylic acid anhydride at a temperature below about 40° C.

6. The process of making vinyl esters which comprises reacting acetylene with an aliphatic mono-carboxylic acid in the presence of a mercury salt, sulfo-acetic acid, and a fatty acid anhydride at a temperature between about 5° and about 25° C.

7. The process of making vinyl esters which comprises reacting acetylene with an aliphatic mono-carboxylic acid in the presence of a mercury salt, sulfo-acetic acid, and acetic anhydride at a temperature between about 5° and about 25° C., and in distilling the reacted mixture in the presence of sodium acetate.

8. The process of making vinyl esters which comprises reacting acetylene with an aliphatic mono-carboxylic acid in the presence of mercury salt, sulfo-acetic acid, and acetic anhydride at a temperature below 50° C., and in distilling the reacted mixture in the presence of one of a group of compounds consisting of sodium acetate and calcium acetate.

9. The process of making vinyl esters which comprises reacting acetylene with an aliphatic mono-carboxylic acid in the presence of mercuric sulfate, sulfo-acetic acid, and a fatty acid anhydride at a temperature below about 40° C.

10. The process of making vinyl esters which comprises reacting acetylene with an aliphatic mono-carboxylic acid in the presence of a mercuric sulfate, sulfo-acetic acid, and acetic anhydride at a temperature between about 5° C. and about 25° C.

11. The process of making vinyl esters which comprises reacting acetylene with an aliphatic monocarboxylic acid in the presence of mercuric sulfate, sulfo-acetic acid, and acetic anhydride at a temperature between about 5° C. and about 25° C. and in distilling the reacted mixture in the presence of one of a group of compounds consisting of sodium acetate and calcium acetate.

In testimony whereof, I affix my signature.

HARRY B. DYKSTRA.